(12) United States Patent  
Chen et al.

(10) Patent No.: US 12,481,762 B2
(45) Date of Patent: Nov. 25, 2025

(54) SYSTEMS AND METHODS FOR USING INTERNAL MEMORY OF A SYSTEM ON CHIP IN A SECURITY BOOT

(71) Applicant: Quanta Computer Inc., Taoyuan (TW)

(72) Inventors: Jhao-Han Chen, Taoyuan (TW); Yen-Ping Tung, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 110 days.

(21) Appl. No.: 18/400,159

(22) Filed: Dec. 29, 2023

(65) Prior Publication Data

US 2025/0217489 A1 Jul. 3, 2025

(51) Int. Cl.
*G06F 21/00* (2013.01)
*G06F 21/57* (2013.01)

(52) U.S. Cl.
CPC ...... *G06F 21/575* (2013.01); *G06F 2221/034* (2013.01)

(58) Field of Classification Search
None
See application file for complete search history.

(56) References Cited

U.S. PATENT DOCUMENTS

| | | | |
|---|---|---|---|
| 11,455,388 B1* | 9/2022 | Jones | G06F 21/566 |
| 11,824,934 B2* | 11/2023 | Nixon | G06F 21/606 |
| 12,326,930 B2* | 6/2025 | Farley | G06F 9/541 |
| 2015/0012737 A1 | 1/2015 | Newell | |
| 2018/0196945 A1* | 7/2018 | Kornegay | G06F 21/57 |
| 2019/0073478 A1* | 3/2019 | Khessib | G06F 13/4282 |
| 2019/0087578 A1 | 3/2019 | Govindarajan et al. | |
| 2021/0096840 A1 | 4/2021 | Kotary et al. | |
| 2021/0224061 A1 | 7/2021 | Pillilli et al. | |
| 2021/0365557 A1* | 11/2021 | Chokshi | G06F 11/3648 |
| 2022/0207474 A1* | 6/2022 | Young | G06Q 10/0833 |
| 2022/0303779 A1* | 9/2022 | Boyapalle | H04W 12/35 |
| 2023/0025053 A1 | 1/2023 | Cho et al. | |
| 2023/0153150 A1* | 5/2023 | Kozlowski | H04L 63/20 718/108 |
| 2023/0229758 A1* | 7/2023 | Terpstra | G06F 21/572 726/26 |
| 2023/0229779 A1* | 7/2023 | Terpstra | G06F 8/63 713/2 |

(Continued)

FOREIGN PATENT DOCUMENTS

TW 202240439 A 10/2022

OTHER PUBLICATIONS

Zhao, Shijun et al. Research on Root of Trust for Embedded Devices based on On-Chip Memory. 2021 International Conference on Computer Engineering and Application (ICCEA). https://ieeexplore.ieee.org/stamp/stamp.jsp?tp=&arnumber=9581138 (Year: 2021).*

(Continued)

*Primary Examiner* — Jeremiah L Avery
(74) *Attorney, Agent, or Firm* — NIXON PEABODY LLP

(57) ABSTRACT

A computing system is provided. The computing system includes a system on a chip. The system on a chip includes a processor and an internal memory. The computing system further includes a root of trust hardware connected to the internal memory and configured to intercept commands from the processor to the internal memory.

16 Claims, 3 Drawing Sheets

(56) References Cited

U.S. PATENT DOCUMENTS

| | | | |
|---|---|---|---|
| 2023/0315913 A1* | 10/2023 | Chandra | G06F 21/572 |
| | | | 726/26 |
| 2024/0134989 A1* | 4/2024 | Veluthakkal | G06F 21/575 |
| 2024/0211275 A1* | 6/2024 | Cudak | G06F 21/572 |
| 2025/0103380 A1* | 3/2025 | Wszolek | G06F 13/4221 |
| 2025/0130829 A1* | 4/2025 | Gu | G06F 9/45504 |

OTHER PUBLICATIONS

Lee, Bongsoo et al. Design and Implementation of Secure Cryptographic System on Chip for Internet of Things. IEEE Access, vol. 10. https://ieeexplore.ieee.org/stamp/stamp.jsp?tp=&arnumber=9713875 (Year: 2022).*

Obermaisser, Roman et al. A Cross-Domain Multiprocessor System-on-a-Chip for Embedded Real-Time Systems. IEEE Transactions on Industrial Informatics, vol. 6, Issue: 4. https://ieeexplore.ieee.org/stamp/stamp.jsp?tp=&arnumber=5570994 (Year: 2010).*

TW Office Action for Application No. 113111327 mailed Mar. 24, 2025, w/ First Office Action Summary, 6 pp.

TW Search Report for Application No. 113111327 mailed Mar. 24, 2025 w/ First Office Action, 2 pp.

* cited by examiner

SYSTEMS AND METHODS FOR USING INTERNAL MEMORY OF A SYSTEM ON CHIP IN A SECURITY BOOT

FIELD OF THE INVENTION

The present invention relates generally to trusted computing in computing systems, and more specifically, to securing programs and data stored in internal memories of system on a chip (SoC) using root of trust (RoT) mechanisms.

BACKGROUND OF THE INVENTION

Computing systems (e.g., servers, desktop computers, laptop computers, etc.) are used in different contexts for a wide range of functions. Some computing systems operate on batteries and may require low-power operation to conserve charge on the batteries. On the other hand, some computing systems may be plugged into a power outlet, and low-power operation is not as important as computing performance. Many computing systems balance performance and power consumption, even when plugged into a power outlet. No matter what type of computing system is used, the computing system is typically initialized when powered-up. The process of initializing the computing system is called booting. Each computing system can have a different booting sequence or procedure based on the specific hardware components present in the computing system. Typically, computing systems store booting sequences or procedures in non-volatile memory. These booting sequences or procedures can also be called firmware. The specific location where the firmware is stored can impact how safe the firmware is from external corruption. A root of trust (RoT) is sometimes used to ensure some level of hardness to firmware corruption, but when the non-volatile memory storing the firmware is within a system on a chip (SoC), conventional ROT mechanisms may not work. The present disclosure provides systems and methods for solving problems associated with communicating settings between processors.

SUMMARY OF THE INVENTION

The term embodiment and like terms, e.g., implementation, configuration, aspect, example, and option, are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter. This summary is also not intended to be used in isolation to determine the scope of the claimed subject matter. The subject matter should be understood by reference to appropriate portions of the entire specification of this disclosure, any or all drawings, and each claim.

According to certain aspects of the present disclosure, a computing system includes a system on a chip including a processor and an internal memory. The computing system further includes a root of trust hardware connected to the internal memory and configured to intercept commands from the processor to the internal memory.

In an implementation, the system on a chip further includes a selector. The selector is configured to connect the internal memory to the processor in a first configuration and configured to connect the root of trust hardware to the internal memory in a second configuration. In an implementation, the selector includes a fuse. In an implementation, the system on a chip is a baseband management controller. In an implementation, the internal memory is a flash memory. In an implementation, the processor communicates with the internal memory via SPI. In an implementation, the SPI connects first with the RoT hardware. In an implementation, the RoT hardware is further configured to pass an expected command of the commands directly to the internal memory. In an implementation, the RoT hardware is further configured to prevent an unexpected command of the commands from passing to the internal memory.

According to certain aspects of the present disclosure, a method includes connecting a root of trust hardware to ports on a system on a chip. The method further includes setting a selector in a first configuration. In the first configuration, communications are routed from a processor of the system on a chip through a root of trust hardware to an internal memory of the system on a chip. The method further includes sending commands from the processor to the internal memory.

In an implementation, the method further includes setting the selector in a second configuration, wherein in the second configuration communications are routed from the processor directly to the internal memory. In an implementation, the ports on the system on a chip are serial peripheral interface (SPI) ports. In an implementation, the root of trust hardware is configured to pass an expected command of the commands directly to the internal memory. In an implementation, the root of trust hardware is configured to prevent an unexpected command of the commands from passing to the internal memory. In an implementation, setting the selector in the first configuration includes disconnecting a fuse using a one-time programmable register. In an implementation, the system on a chip is a baseband management controller. In an implementation, the internal memory is a flash memory. In an implementation, the flash memory includes a firmware image.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims. Additional aspects of the disclosure will be apparent to those of ordinary skill in the art in view of the detailed description of various embodiments, which is made with reference to the drawings, a brief description of which is provided below.

BRIEF DESCRIPTION OF THE DRAWINGS

The disclosure, and its advantages and drawings, will be better understood from the following description of representative embodiments together with reference to the accompanying drawings. These drawings depict only rep

DETAILED DESCRIPTION

Figure 1:
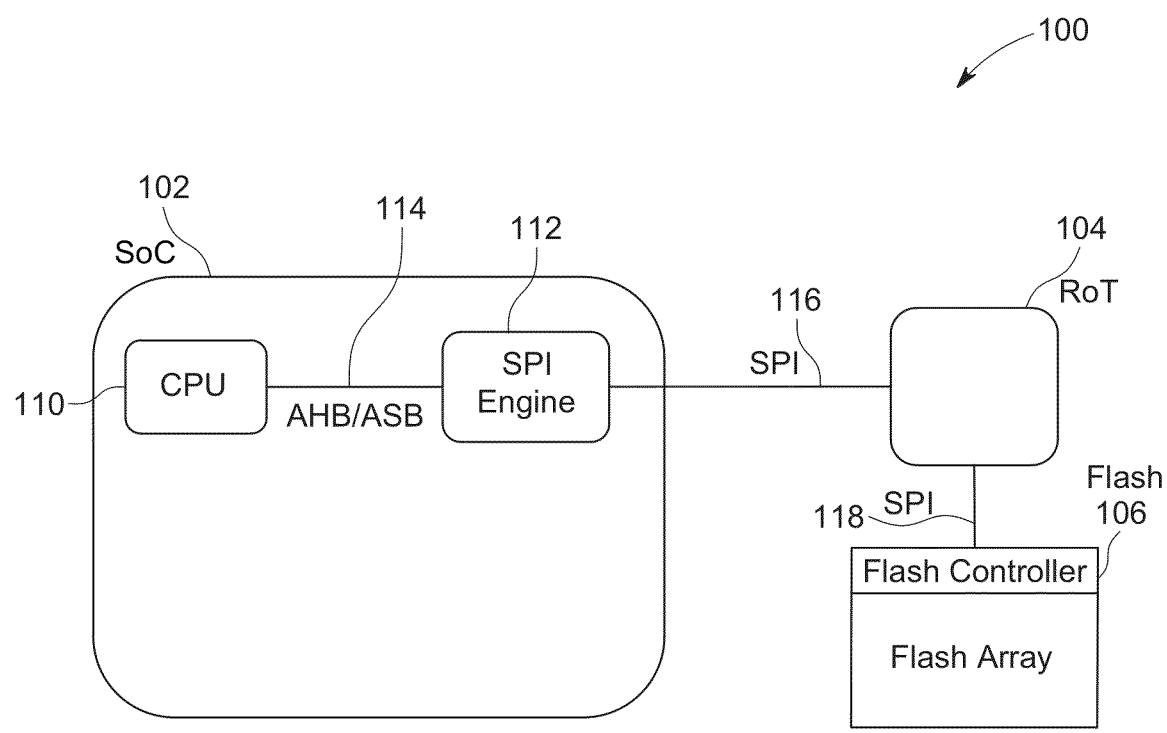
- FIG. 1 is a block diagram of a controller topology in the prior art.

In a computing system, e.g., in a server system, the root of trust (RoT) can be an essential component because the ROT allows firmware images to be trusted. The RoT protects firmware images from being broken. Firmware images are typically stored in an external flash, and a firmware controller accesses the firmware images stored in the external flash using a serial peripheral interface (SPI) bus. The ROT monitors signals on the SPI bus, and if there are unexpected commands that seek to modify firmware images, the ROT can stop execution of the unexpected commands to preserve integrity of the firmware images.

Firmware images are typically stored in external flash due to the size of the firmware images. However, in some instances the firmware image may be small enough to be stored in an internal flash in the firmware controller. Because the flash is internal to the firmware controller, the SPI bus for accessing the internal flash is not accessible to the RoT. Thus, the ROT cannot preserve integrity of the firmware image in a same manner as described above in connection to external memory. By not being able to use a RoT, the computing system is less secure. Embodiments of the present disclosure provide an architecture for accessing SPI buses to monitor firmware images stored in internal flash memories.

Various embodiments are described with reference to the attached figures, where like reference numerals are used throughout the figures to designate similar or equivalent elements. The figures are not necessarily drawn to scale and are provided merely to illustrate aspects and features of the present disclosure. Numerous specific details, relationships, and methods are set forth to provide a full understanding of certain aspects and features of the present disclosure, although one having ordinary skill in the relevant art will recognize that these aspects and features can be practiced without one or more of the specific details, with other relationships, or with other methods. In some instances, well-known structures or operations are not shown in detail for illustrative purposes. The various embodiments disclosed herein are not necessarily limited by the illustrated ordering of acts or events, as some acts may occur in different orders and/or concurrently with other acts or events. Furthermore, not all illustrated acts or events are necessarily required to implement certain aspects and features of the present disclosure.

For purposes of the present detailed description, unless specifically disclaimed, and where appropriate, the singular includes the plural and vice versa. The word "including" means "including without limitation." Moreover, words of approximation, such as "about," "almost," "substantially," "approximately," and the like, can be used herein to mean "at," "near," "nearly at," "within 3-5% of," "within acceptable manufacturing tolerances of," or any logical combination thereof. Similarly, terms "vertical" or "horizontal" are intended to additionally include "within 3-5% of" a vertical or horizontal orientation, respectively. Additionally, words of direction, such as "top," "bottom," "left," "right," "above," and "below" are intended to relate to the equivalent direction as depicted in a reference illustration; as understood contextually from the object(s) or element(s) being referenced, such as from a commonly used position for the object(s) or element(s); or as otherwise described herein.

Referring to FIG. 1, a block diagram of a controller topology 100 in the prior art is provided. The controller topology 100 includes a system on a chip (SoC) 102, a root of trust hardware 104, and an external flash 106. The root of trust hardware 104 monitors an SPI bus between the SoC 102 and the external flash 106. The root of trust hardware 104 is placed between the SoC 102 and the external flash 106 to intercept information traveling on the SPI bus. The SPI bus includes (i) a first SPI bus portion 116 between the SoC 102 and the root of trust hardware 104 and (ii) a second SPI bus portion 118 between the root of trust hardware 104 and the external flash 106.

The SoC 102 includes a central processing unit (CPU) 110 and an SPI engine 112. The CPU 110 connects to the SPI engine 112 via a system bus 114. The system bus 114 can be an advanced high-performance bus (AHB) or an advanced system bus (ASB). The CPU 110 accesses the external flash 106 via the SPI engine 112. If the root of trust hardware 104 detects an unexpected command from the CPU 110 on the first SPI bus portion 116, the root of trust hardware 104 prevents the command from passing to the external flash 106 via the second SPI bus portion 118. If there are only cleared commands, the root of trust hardware 104 allows the cleared commands to pass to the external flash 106.

Figure 2:
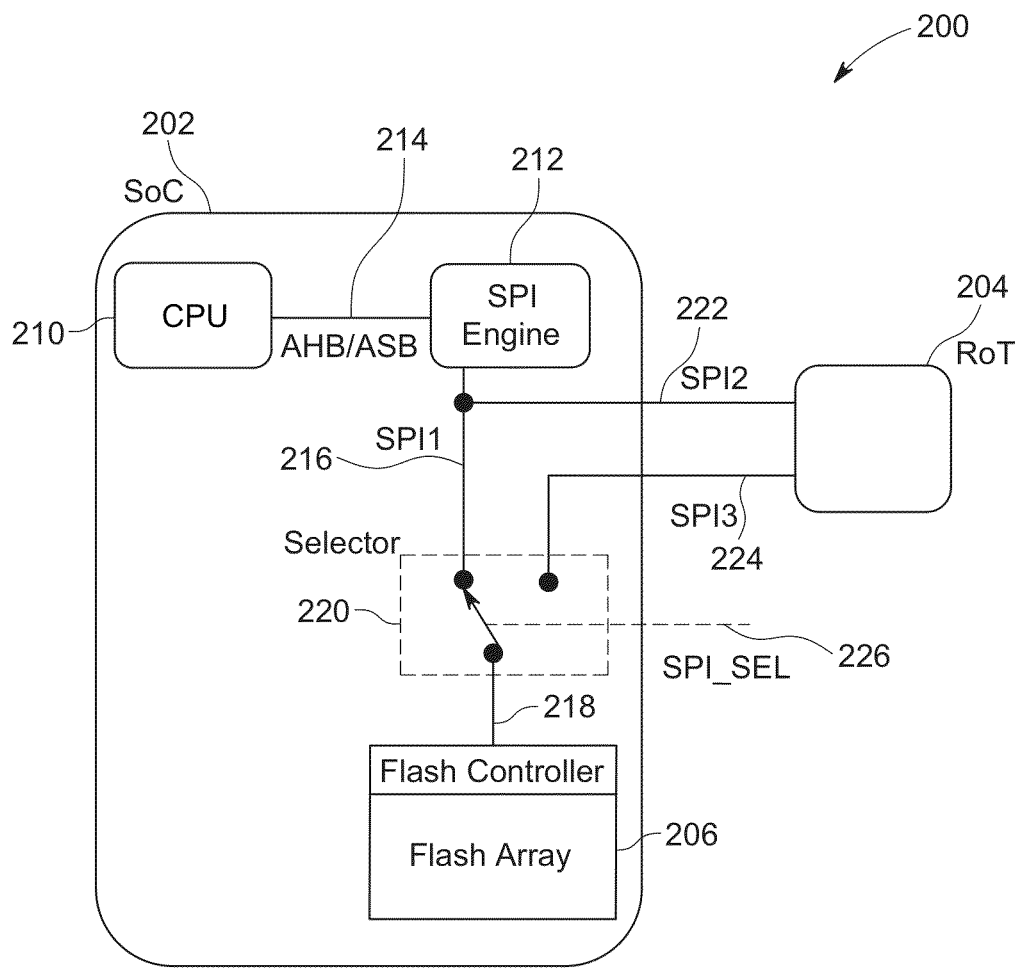
FIG. 2 is a block diagram of a controller topology, according to certain aspects of the present disclosure.

Referring to FIG. 2, a block diagram of a controller topology 200 is provided, according to certain aspects of the present disclosure. The controller topology 200 includes an SoC 202 and a root of trust hardware 204. The SoC 202 includes a CPU 210, an SPI engine 212, a selector 220, and an internal flash 206. The CPU 210 is analogous to the CPU 110, and the SPI engine 212 is analogous to the SPI engine 112. Similar to FIG. 1, the CPU 210 connects to the SPI engine 212 via a system bus 214. The system bus 214 can be AHB or ASB. The SoC 202 provides several ports for interacting with components outside the SoC 202. These ports include SPI ports (i.e., SPI2 222 and SPI3 224). In some implementations, the ports also include an input selector port SPI_SEL port 226. The SPI ports SPI2 222 and SPI3 224 facilitate connecting the root of trust hardware 204 to the SoC 202 so that the root of trust hardware 204 can monitor commands provided to the internal flash 206. The SoC 202 includes an SPI bus SPIL 216 that connects the SPI engine 212 to the selector 220. The SPI bus SPI1 216 is connected to the SPI port SPI2 222. The selector 220 connects the internal flash 206 to the SPI bus SPI1 216 and the SPI ports SPI2 222 and SPI3 224.

The SPI_SEL port 226 is used to connect the internal flash 206. The SPI_SEL port 226 controls whether the selector 220 connects to the SPI1 216 or SPI3 224. For example, when signal on the SPI_SEL port 226 is high, the SPI engine 212 connects to the internal flash 206 through SPI1 216 and the CPU 210 can directly access the internal flash 206. Otherwise, the SPI engine 212 needs to connect to root of trust hardware 204 first via the SPI2 222, which means all SPI commands to the internal flash 206 is filtered by the root of trust hardware 204 before being passed to the internal flash 206 via the SPI3 224. Table 1 summarizes the above description.

| SPI_SEL | Flash Connects to | RoT |
|---|---|---|
| H | SPI1 | X |
| L | SPI3 | O |

In some implementations, the SPI_SEL port 226 can use hardware strapping to implement control, which can avoid the selector path being controlled by any software method. The hardware strapping can be a pull-up/pull-down resistor, a switch, a jumper, etc. In some implementations, a first fuse is incorporated on the SPI1 216, and a second fuse is incorporated on SPI3 224. The first fuse can be disconnected by a CPU one-time program (OTP) register to force root of trust protection. That is, the first fuse is opened while the second fuse remains closed. In some implementations, only the first fuse is provided.

Figure 3:
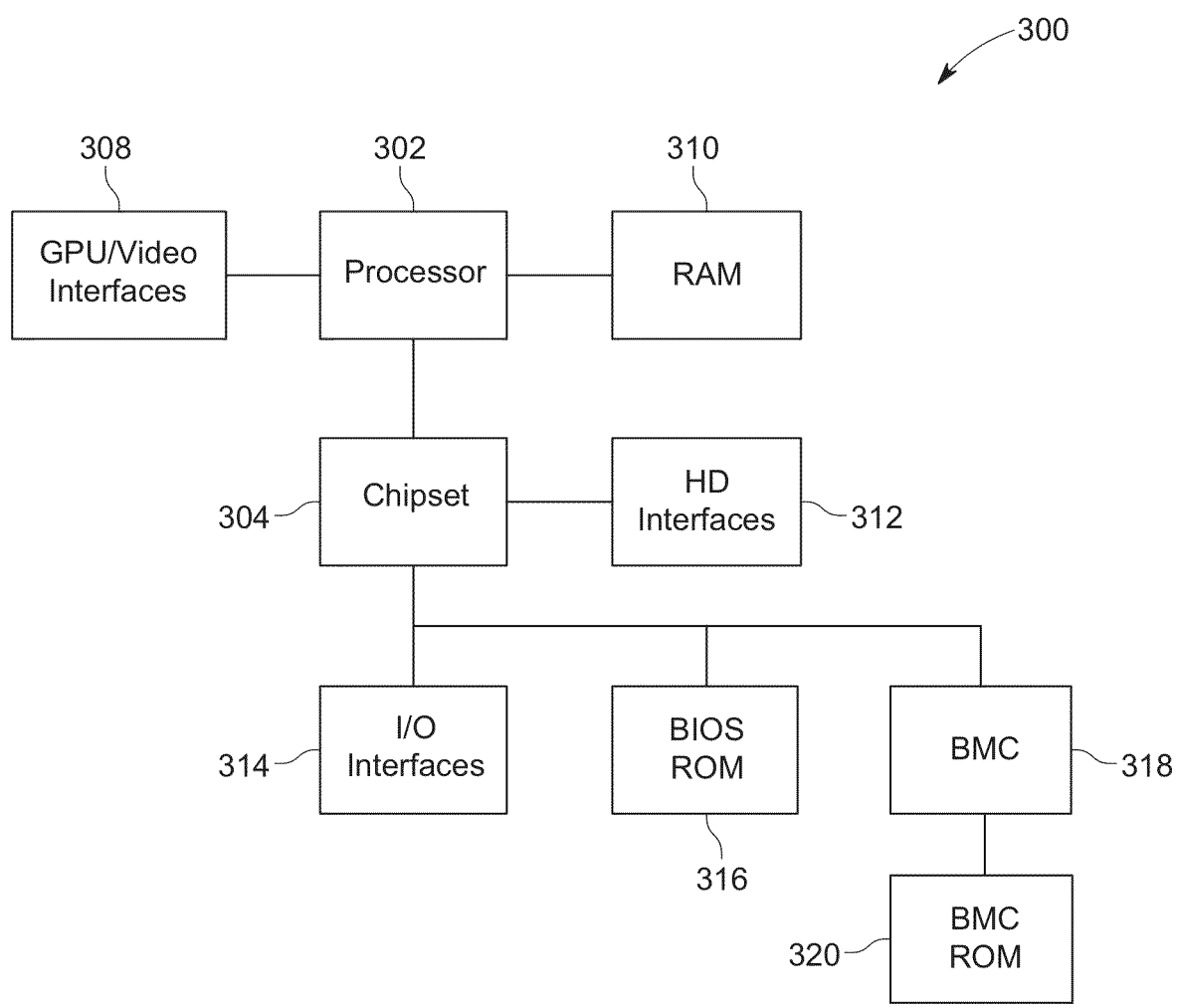
FIG. 3 is a block diagram of a computing system, according to certain aspects of the present disclosure.

FIG. 3 is a block diagram of a computing system 300, according to certain aspects of the present disclosure. Examples of the computing system 300 include a server, a laptop, a desktop computer, a smartphone, etc. The computing system 300 includes a processor 302, graphics processing unit (GPU)/video interfaces 308, a chipset 304, random access memory (RAM) modules 310, input/output (I/O) interfaces 314, hard disk (HD) interfaces 312, a BIOS read only memory (ROM) 316, a BMC 318, and/or a BMC ROM 320. Each of the components provided in FIG. 3 can be provided on a circuit board of the computing system 300. The circuit board can be a printed circuit board (PCB) that serves as a communications backbone for all components and external peripherals that connect to the computing system 300. In some examples, the circuit board is a motherboard that includes copper connecting traces and copper planes for power and signal isolation.

Although indicated as singular in FIG. 3, the processor 302 can be one or more processors (e.g., one processor, two processors, three processors, etc.). The processor 302 can include CPUs and GPUs. In some implementations, GPUs are separated from CPUs and communicate with CPUs via the one or more I/O interfaces 314 or the one or more GPU/video interfaces 308. For example, the I/O interfaces 314 include peripheral component interconnect express (PCIe) slots for receiving GPUs, and the CPUs can manage initialization and operation of the GPUs via the PCIe bus standard. The GPUs are coupled to video interfaces that enables viewing of information on monitors or screens.

The RAM modules 310 can include dual inline memory modules (DIMMs) of double data rate synchronous dynamic random access memory (DDR SDRAM). The RAM modules 310 are high speed volatile memory modules that serve as main memory for the processor 302. The main memory for the processor 302 is used when cache memory or register memory of the processor 302 does not include information that the processor 302 needs. The RAM modules 310 are higher capacity memory when compared to the cache memory or register memory of the processor 302.

The BIOS ROM 316 and the BMC ROM 320 can be provided in order to facilitate initialization of components of the computing system 300. The BIOS ROM 316 can be a BIOS non-volatile memory (e.g., a flash memory) including instructions, settings, and/or configurations for the processor 302 (e.g., a CPU) to booting both the BIOS program that initializes components of the computing system 300. Similarly, the BMC ROM 320 can be a non-volatile memory including instructions, settings, and/or configurations for the BMC 318 to initialize the computing system 300. In some implementations, the BIOS ROM 316 and/or the BMC ROM 320 are internal serial peripheral interface (SPI) flash memories. For example, the BMC ROM 320 is an SPI memory internal to the BMC 318. The BMC 318 can be analogous to SoC 202 (FIG. 2) with the BMC ROM 320 being the internal flash 206 (FIG. 2).

The BIOS ROM 316 contains a BIOS image. The BIOS image is a configuration file that includes instructions for basic setup of the computing system 300. The BIOS image includes a power-on self-test (POST) function, a bootstrap loader function, load BIOS drivers function, and/or BIOS configuration setup. The POST function is an initial test of computer hardware to ensure errors do not exist before loading of an operating system of the computing system 300. The bootstrap loader function locates the operating system on the computing system 300, and in some implementations, can pass control to the operating system once the BIOS setup is complete. The load BIOS drivers function involves executing low-level drivers to provide basic operational control over some hardware components of the computing system 300. In some cases, these hardware components include peripheral devices like mice, keyboards, or other input devices. The BIOS configuration setup is a program that allows configuring hardware settings (e.g., date and time). The BMC ROM 320 includes a BMC image. The BMC image includes an embedded operating system, an application for management function, space configurations concerning saving BMC log and configuration data, etc. The BMC image facilitates booting the BMC 318.

The BMC 318 is a specialized controller (or processor) for managing operations of the computing system 300. In some implementations, the BMC 318 enables remote monitoring of the computing system 300, having communication channels to different components of the computing system 300. For example, the BMC 318 can allow remote monitoring of fan speeds, temperature sensors, hard drive faults, power supply failures, operating system faults, etc. The BMC 318 can include internal temporary cache memory that facilitates the BMC 318 processing of machine readable instructions. Example BMCs include ASPEED AST2300, AST2400, AST2500, AST2600, etc.

The one or more I/O interfaces 314 can include serial AT attachment (SATA) ports to connect bus adapters to storage devices such as hard disk drives, solid state drives, optical drives, etc. The I/O interfaces 314 can include more PCI or PCIe ports for receiving cards such as Ethernet cards, Wi-Fi cards, Bluetooth cards, sound cards, etc. The I/O interfaces 314 can include universal serial bus (USB) ports to connect peripheral devices or mass storage devices.

The chipset 304 is a chip that is directly connected to the processor and provides access to components that communicate at a slower speed compared to the other components connected to the processor 302 (e.g., the GPU/video interfaces 308 and the RAM modules 310). For example, the chipset 304 can connect the HD interfaces 312, the I/O interfaces 314, the BIOS ROM 316, the BMC 318, etc. The HD interfaces 312 can include serial advanced technology attachment (SATA), integrated drive electronics (IDE), peripheral component interconnect (PCI) interface, etc.

Although the above descriptions focus on SPI bus on flash, other storage and storage interfaces can benefit from embodiments of the present disclosure. Examples of storage and storage interface include NAND flash (Open NAND Flash Interface (ONFI), Toggle), SD (SD bus, SPI bus), UFS, eMMC, and so on.

Although the disclosed embodiments have been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

While various embodiments of the present disclosure have been described above, it should be understood that they have been presented by way of example only, and not limitation. Numerous changes to the disclosed embodiments can be made in accordance with the disclosure herein, without departing from the spirit or scope of the disclosure. Thus, the breadth and scope of the present disclosure should not be limited by any of the above described embodiments. Rather, the scope of the disclosure should be defined in accordance with the following claims and their equivalents.

What is claimed is:

1. A computing system comprising:
    a system on a chip including a processor, an internal memory, and a selector, the system on a chip further including a plurality of ports that includes a first port and a second port, the selector being configured to connect the internal memory to the processor, via the first port, in a first configuration in which the processor has direct access to the internal memory, the selector being further configured to connect the internal memory to the processor, via the second port, in a second configuration in which the process has indirect access to the internal memory;
    a root of trust (RoT) hardware connected to the internal memory and configured to intercept commands from the processor to the internal memory, the RoT hardware being positioned outside the system on a chip and coupled to both the first port and the second port, the first port providing access to intercept commands from the processor before the commands are received by the internal memory or by the selector, the second port providing access to the internal memory, via the selector, to filter all commands from the processor to the internal memory via the RoT hardware in the second configuration.

2. The system of claim 1, wherein the selector includes a fuse.

3. The system of claim 1, wherein the system on a chip is a baseband management controller (BMC).

4. The system of claim 1, wherein the internal memory is a flash memory.

5. The system of claim 1, wherein the processor communicates with the internal memory via a serial peripheral interface (SPI).

6. The system of claim 5, wherein the SPI connects first with the ROT hardware.

7. The system of claim 5, wherein the ROT hardware is further configured to pass an expected command of the commands directly to the internal memory.

8. The system of claim 5, wherein the ROT hardware is further configured to prevent an unexpected command of the commands from passing to the internal memory.

9. A method, comprising:
    connecting a root of trust (RoT) hardware to ports on a system on a chip, the system on a chip including a processor, an internal memory, and a selector, the ports including a plurality of ports that includes a first port and a second port, the RoT hardware being positioned outside the system on a chip and being coupled to both the first port and the second port;
    setting the selector in a first configuration, wherein in the first configuration communications are routed from the processor, via the selector, directly to the internal memory, the first configuration being achieved via the first port that couples the processor to the internal memory directly through the selector; and
    setting the selector in a second configuration, wherein in the second configuration communications are routed from the processor through the ROT hardware indirectly, via the selector, the second configuration being achieved via the second port that couples the processor to the internal memory indirectly through the ROT hardware and the selector.

10. The method according to claim 9, wherein the ports on the system on a chip are serial peripheral interface (SPI) ports.

11. The method according to claim 10, wherein the ROT root of trust hardware is configured to pass an expected command of the commands directly to the internal memory.

12. The method according to claim 10, wherein the ROT root of trust hardware is configured to prevent an unexpected command of the commands from passing to the internal memory.

13. The method according to claim 9, wherein setting the selector in the first configuration includes disconnecting a fuse using a one-time programmable register.

14. The method according to claim 9, wherein the system on a chip is a baseband management controller (BMC).

15. The method according to claim 9, wherein the internal memory is a flash memory.

16. The method according to claim 15, wherein the flash memory includes a firmware image.

* * * * *